United States Patent Office 3,219,556
Patented Nov. 23, 1965

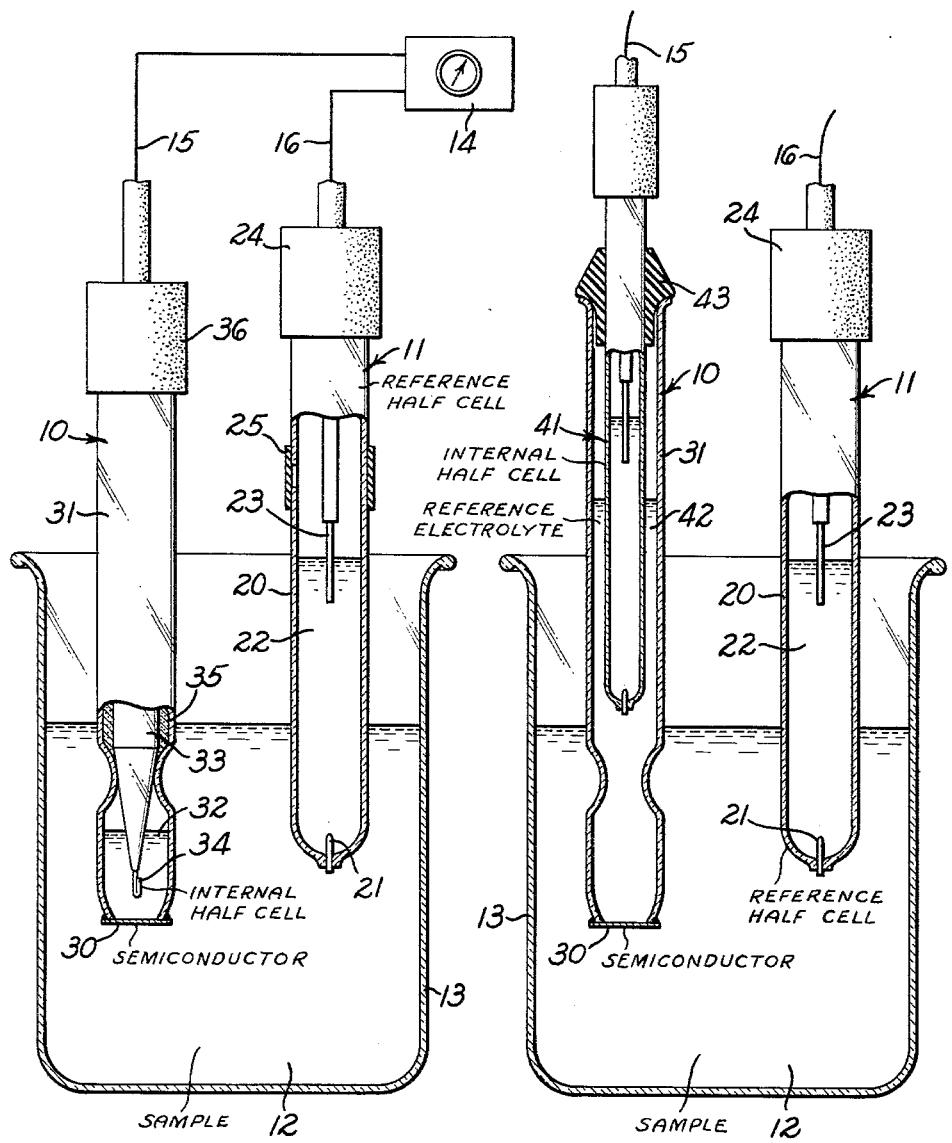

3,219,556
ION MEASUREMENT APPARATUS AND METHOD
Edwin P. Arthur and John E. Leonard, Fullerton, Calif., assignors to Beckman Instruments, Inc., a corporation of California
Filed Dec. 26, 1961, Ser. No. 162,008
15 Claims. (Cl. 204—1)

The present invention relates to the measurement of ion concentration in solutions using the well-known technique of measuring the electrical potential developed at the junction of the sample solution and an ion sensitive member. The measurement of hydrogen ion concentration for pH is probably the best-known example of this type of measuring system but many other ions and groups of ions may be measured, using ion sensitive members with various characteristics.

In a conventional pH measuring system, a reference electrode containing an internal half cell contacts the sample via a liquid junction. A sensing electrode carrying an ion sensitive glass membrane and another internal half cell contacts the sample at the glass membrane. An electrical potential is developed at the surface of the glass membrane in contact with the sample solution and the magnitude of this potential varies as a function of ion concentration in the solution. This potential is ordinarily determined by measuring the potential difference existing between the two half cells. A wide variety of glass compositions are used in making glass membranes to provide sensing electrodes with various ion measuring capabilities.

It is an object of the present invention to provide a new type of ion sensitive member for use in sensing electrodes which member is not vitreous in nature. It is a specific object of the invention to provide a new ion potential measuring device in which the ion sensitive member is a doped crystalline semiconductor material. A further object is to provide such an apparatus and method in which cation concentration is measured by using an n-type surface in contact with the sample and anion measurement is made by using a p-type surface in contact with the sample.

Other objects, advantages, features and results of the invention will more fully appear in the course of the following description. The drawing merely shows and the description merely describes preferred embodiments of the present invention which are given by way of illustration or example.

In the drawing:
FIG. 1 illustrates a preferred embodiment of the ion measurement system of the invention; and
FIG. 2 illustrates an alternative form of the invention particularly suited for calibration and testing.

Referring to the embodiment of FIG. 1, a sensing electrode 10 and a reference electrode 11 are immersed in a sample 12 supported in a beaker 13. The two electrodes are connected to a meter 14 by conductors 15, 16.

The reference electrode 11 is conventional in design and may comprise a tube 20 having a fiber or rod 21 sealed in the lower end to provide a liquid junction between the sample 12 and en electrolyte 22 within the tube. An internal half-cell formed of a silver wire 23 with a silver chloride coating is mounted within the tube and dips into the electrolyte 22. A cap 24 closes the upper end of the tube, with the conductor 16 extending through the cap and connecting with the wire 23. A sleeve 25 may be provided on the tube for slidably closing an opening in the tube wall, which opening provides for changing the electrolyte.

The sensing electrode 10 may, with the exception of the ion sensitive member, also be conventional in construction. A wafer 30 of semiconductor material is sealed over the lower end of a glass tube 31 using a silicone resin or other suitable sealing material. An electrolyte 32 and another glass tube 33 are contained within the tube 31. An internal half-cell formed of a silver wire 34 with a silver chloride coating is sealed in the tube 33 and projects into the electrolyte 32. A sealing compound 35, such as asphalt or the like, may be used to fill the space between the tubes 31, 33, with the upper end of the structure closed by a cap 36. The conductor 15 passes through the cap and connects with the wire 34.

The wafer 30 of semiconductor material is fixed to the stem or tube 31 with one type surface, i.e., a p-type surface or an n-type surface, positioned for contacting the sample. The structure will be sensitive to cation concentration when the exposed surface is n-type and will be sensitive to anion concentration when the exposed surface is p-type.

The embodiment of FIG. 2 shows an alternate embodiment wherein the sensing electrode is provided with a separate internal half cell 41 and a bridge or reference electrolyte 42. The internal half cell 41 may be identical in design and construction to the reference electrode 11 and is supported in the tube 31 in a stopper 43. The embodiment of FIG. 2 is otherwise identical to that of FIG. 1 and corresponding elements are identified by the same reference numerals.

The embodiment of FIG. 2 is particularly suitable for experimental and laboratory testing as it permits rapid calibration of the over-all system. The internal half cell structure 41 may be removed from the sensing electrode and inserted directly in the sample solution alongside the reference electrode. Then the indicated output should be zero, providing a positive check on the operation of the system.

In one specific form of the invention, an n-p-n silicon semiconductor wafer was used to measure hydrogen ion concentration in a sample. A wafer 0.0015 inch thick and about 10 mm. diameter was used as the ion sensitive member. Identical internal half cells were used for the reference electrode and the internal half cell of the sensing electrode. Each internal half cell had a silver wire coated with silver chloride and and an electrolyte of saturated silver chloride and 4 M potassium chloride. The reference electrolyte 42 in the sensing electrode was a buffered 0.001 M potassium chloride solution of pH 4.

After calibration checking by insertion of both half cells in the same solution, the apparatus was arranged as shown in FIG. 2. The first sample comprised a buffer solution of pH 7 at 22½° C. The meter reading was 250 mv. The second sample was a buffer solution of pH 10 at 22½° C. and the meter reading was 430 mv. The indicated difference is 180 mv. for three pH units, a substantially Nernstian response.

In another test, a p-n-p silicon semiconductor wafer of the same size as in the previous example was used to measure fluoride ion concentration. The sample comprised a pH 7 buffer solution at 22½° C. The meter indication was −20 mv. A small quantity of sodium fluoride salt was then added to the buffered solution and the meter indication immediately changed to −60 mv., indicating that the p-type surface was sensitive to fluoride anions.

Various semiconductor materials may be used as the ion sensitive member in the sensing electrode and the present invention is not limited to the specific materials described above. The various well-known silicon and germanium semiconductor materials as well as others, such as silicon carbide, lead-tin-antimonide, and the like, with controlled impurity dopings providing controlled crystal orientation and surface potential can be used.

We claim as our invention:

1. A method of measuring the ion concentration in a liquid, including the steps of:
   contacting the liquid with a sensing electrode having a portion thereof formed of a doped semiconductor material;
   contacting the liquid with a reference electrode; and
   measuring the equilibrium electrical potential developed at the junction of the surface of the semiconductor material and the liquid as a function of the ion concentration in the liquid, said electrodes contacting said liquid being the sole means for generating a current indicative of the ion concentration of the liquid.

2. In a system for measuring the ion concentration of a sample, the combination of:
   a reference electrode;
   a sensing electrode having a portion thereof formed of a doped semiconductor material; and
   an electrical circuit connecting said electrodes and having means for measuring the equilibrium electrical potential developed at the junction of the surface of the semiconductor material and the liquid as a function of the ion concentration in the liquid, said circuit being free of any means associated therewith other than said electrodes and sample for driving a current through said electrodes.

3. In an ion potential measuring electrode having a container of nonconductive material for an electrolyte, an internal half cell in said container, an ion sensitive barrier closing an end of said container and means sealing said barrier to said end of said container against electrolytic communication through the contacting portions of said barrier and said container, the improvement comprising a doped crystalline semiconductor wafer as the ion sensitive barrier.

4. In an anion potential measuring electrode having a container of nonconductive material for an electrolyte, an internal half cell in said container, an ion sensitive barrier closing an end of said container and means sealing said barrier to said end of said container against electrolytic communication through the contacting portions of said barrier and said container, the improvement comprising a crystalline n-p semiconductor wafer as the ion sensitive barrier with the p-type surface being external of said container for contacting a liquid sample.

5. In a cation potential measuring electrode having a container of nonconductive material for an electrolyte, an internal half cell in said container, an ion sensitive barrier closing an end of said container and means sealing said barrier to said end of said container against electrolytic communication through the contacting portions of said barrier and said container, the improvement comprising a crystalline n-p semiconductor wafer as the ion sensitive barrier with the n-type surface being external of said container for contacting a liquid sample.

6. In a fluoride ion potential measuring electrode having a container of nonconductive material for an electrolyte, an internal half cell in said container, an ion sensitive barrier closing an end of said container and means sealing said barrier to said end of said container against electrolytic communication through the contacting portions of said barrier and said container, the improvement comprising a p-n-p silicon semiconductor wafer as the ion sensitive barrier.

7. In a hydrogen ion potential measuring electrode having a container of a nonconductive material for an electrolyte, an internal half cell in said container, an ion sensitive barrier closing an end of said container and means sealing said barrier to said end of said container against electrolytic communication through the contacting portions of said barrier and said container, the improvement comprising an n-p-n silicon semiconductor wafer as the ion sensitive barrier.

8. In a system for measuring the ion concentration of a liquid, the combination of:
   a reference electrode;
   a sensing electrode comprising a container of nonconductive material for an electrolyte, an internal half cell in said container, an ion sensitive barrier closing an end of said container and means sealing said barrier to said end of said container against electrolytic communication through the contacting portions of said barrier and said container, said barrier comprising a doped crystalline semiconductor wafer; and
   means connected to said electrodes for measuring the electrical potential developed at the junction of the liquid and said wafer.

9. A method of measuring ion concentration in a liquid, including the steps of:
   providing a sensing electrode comprising a container of nonconductive material for an electrolyte, an internal half cell in said container, an ion sensitive barrier closing an end of said container and means sealing said barrier to said end of said container against electrolytic communication through the contacting portions of said barrier and said container, said barrier comprising a doped crystalline semiconductor wafer with a surface being external of said container for contacting the liquid;
   contacting the liquid with said external surface of the wafer of said sensing electrode;
   contacting the liquid with a reference electrode; and
   measuring the electrical potential developed at the junction of the liquid and said wafer as a measure of the ion concentration in the liquid.

10. A method of measuring anion concentration in a liquid, including the steps of:
    providing a sensing electrode comprising a container of nonconductive material for an electrolyte, an internal half cell in said container, an ion sensitive barrier closing an end of said container and means sealing said barrier to said end of said container against electrolytic communication through the contacting portions of said barrier and said container, said barrier comprising a crystalline n-p semiconductor wafer with the p-type surface being external of said container for contacting the liquid;
    contacting the liquid with the p-type surface of said external wafer of said sensing electrode;
    contacting the liquid with a reference electrode; and
    measuring the electrical potential developed at the junction of the liquid and said p-type surface as a measure of the anion concentration in the liquid.

11. A method of measuring cation concentration in a liquid, including the steps of:
    providing a sensing electrode comprising a container of nonconductive material for an electrolyte, an internal half cell in said container, an ion sensitive barrier closing an end of said container and means sealing said barrier to said end of said container against electrolytic communication through the contacting portions of said barrier and said container, said barrier comprising a crystalline n-p semiconductor wafer with the n-type surface being external of said container for contacting the liquid;
    contacting the liquid with the said external n-type surface of the wafer of said sensing electrode;
    contacting the liquid with a reference electrode; and
    measuring the electrical potential developed at the junction of the liquid and said n-type surface as a measure of the cation concentration in the liquid.

12. A method of measuring fluoride ion concentration in a liquid, including the steps of:
    providing a sensing electrode comprising a container of nonconductive material for an electrolyte, an internal half cell in said container, an ion sensitive barrier closing an end of said container and means sealing said barrier to said end of said container against electrolytic communication through the contacting portions of said barrier and said container, said barrier comprising a p-n-p semiconductor wafer with a p-type surface external of said container for contacting the liquid;

contacting the liquid with the external p-type surface of the wafer of said sensing electrode;

contacting the liquid with a reference electrode; and measuring the electrical potential developed at the junction of the liquid and said wafer as a measure of the fluoride ion concentration in the liquid.

13. In a method of measuring hydrogen ion concentration in a liquid, including the steps of:

providing a sensing electrode comprising a container of nonconductive material for an electrolyte, an internal half cell in said container, an ion sensitive barrier closing an end of said container and means sealing said barrier to said end of said container against electrolytic communication through the contacting portions of said barrier and said container, said barrier comprising an n-p-n semiconductor wafer with an n-type surface external of said container for contacting the liquid;

contacting the liquid with said external n-type surface of the wafer of said sensing electrode;

contacting the liquid with a reference electrode; and measuring the electrical potential developed at the junction of the liquid and said wafer as a measure of the hydrogen ion concentration in the liquid.

14. An ion potential measuring electrode comprising: container of nonconductive material for an electrolyte, an internal half cell in said container, an ion sensitive barrier closing an end of said container, means sealing said barrier to said end of said container against electrolytic communication through the contacting portions of said barrier and said container, and said barrier having a thickness relatively thin as compared to the width of said barrier, the improvement comprising a doped crystalline semiconductor material as the ion sensitive barrier.

15. An ion potential measuring electrode comprising:

a container of nonconductive material for holding an electrolyte;

an internal half cell disposed in said container for contacting said electrolyte;

an ion sensitive barrier closing an end of said container, means sealing said barrier to said end of said container against electrolytic communication through the contacting portions of said barrier and said container, and said barrier having a thickness relatively thin as compared to the width of said barrier; and the outer surface of said barrier adapted to contact a liquid sample being formed of a doped crystalline semiconductor material.

References Cited by the Examiner

UNITED STATES PATENTS 2,510,262  5/1950  Sollner.
2,979,444  4/1961  Tiley _____ 204—143

FOREIGN PATENTS 1,131,213  10/1956  France.

OTHER REFERENCES

Chemical Abstracts, vol. 31, 1937, page 8437.

Flynn: "J. of Electrochem. Soc.," vol. 105, 1958, pp. 715–718.

Gobrecht et al., "Zeit. fur Elektrochemie," vol. 63, 1959, pp. 541–550.

Hume et al., "American Chemical Society Journal," vol. 63, October 1941, pp. 2805–6.

Kamienski: "Zeitschr fuer Physikalische Chemie," vol. 138, 1928, pp. 345–8.

Turner: "Analytical Chemistry," vol. 33, No. 7, June 1961, pages 959 and 60.

Turner: "Journal of the Electrochemical Society," vol. 103, No. 4, April 1956, pp. 252–6.

Turner: "J. of Electrochem. Soc.," vol. 106, 1959, pp. 786–790.

JOHN H. MACK, *Primary Examiner.*

JOHN R. SPECK, MURRAY TILLMAN, WINSTON A. DOUGLAS, *Examiners.*

UNITED STATES PATENT OFFICE
CERTIFICATE OF CORRECTION

Patent No. 3,219,556　　　　　　　　　　　　November 23, 1965

Edwin P. Arthur et al.

It is hereby certified that error appears in the above numbered patent requiring correction and that the said Letters Patent should read as corrected below.

Column 4, lines 45 and 46, for "the p-type surface of said external wafer" read -- said external p-type surface of the wafer --; column 5, line 30, for "An ion potential measuring electrode comprising:" read -- In an ion potential measuring electrode having a --.

Signed and sealed this 20th day of September 1966.

(SEAL)
Attest:

ERNEST W. SWIDER　　　　　　　　　　　　EDWARD J. BRENNER
Attesting Officer　　　　　　　　　　　　Commissioner of Patents